T. V. BUCKWALTER.
BEARING CAGE.
APPLICATION FILED JULY 18, 1918.

1,395,385.

Patented Nov. 1, 1921.
2 SHEETS—SHEET 1.

Inventor:
Tracy V. Buckwalter;
By Chas. N. Butler
Attorney.

T. V. BUCKWALTER.
BEARING CAGE.
APPLICATION FILED JULY 18, 1918.

1,395,385.

Patented Nov. 1, 1921.
2 SHEETS—SHEET 2.

Inventor:
Tracy V. Buckwalter,
By Chas. N. Butler
Attorney.

UNITED STATES PATENT OFFICE.

TRACY V. BUCKWALTER, OF CANTON, OHIO, ASSIGNOR TO TIMKEN ROLLER BEARING COMPANY, OF CANTON, OHIO, A CORPORATION OF OHIO.

BEARING-CAGE.

1,395,385.

Specification of Letters Patent.  Patented Nov. 1, 1921.

Application filed July 18, 1918. Serial No. 245,443.

*To all whom it may concern:*

Be it known that I, TRACY V. BUCK-WALTER, a citizen of the United States, residing at Canton, in the county of Stark and State of Ohio, have invented an Improved Bearing-Cage, of which the following is a specification.

This invention relates to anti-friction bearings and it comprises an improved cage made and assembled in the bearing by an improved method.

Primary objects of the improvements are to provide a cage that will conform better to the contour of the rollers with improved control thereof, permit the use of an increased number of rollers under given conditions, reduce the weight of the cage required for a given use, and reduce the number of operations, together with the cost of manufacture.

In the manufacture of cages for cone bearings, as preferably practised, the operations comprise cutting metal tubing of the required character into tubular sections of the required length, die shaping the sections to the desired conical forms, perforating the conical blanks to provide, roughly, seats separated by bridges for the rollers, and forming such bridges and seats approximately to the contour of and so as to control the rollers, the forming operations comprising not only the production of the desired contact surfaces but also the bending of the bridges to facilitate assembly of the parts if desired.

The operations may be varied as, for instance, by stamping blanks out of flat stock and pressing such blanks to conical form.

The characteristic features of my improvements are fully set forth in the following description and the accompanying drawing in illustration thereof.

Figure 1:
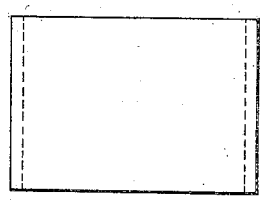
Figure 3:
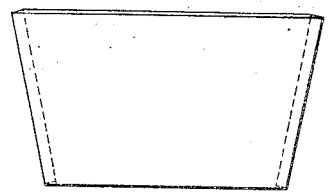
Figure 2:
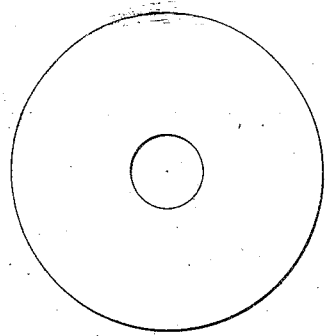
Figure 4:
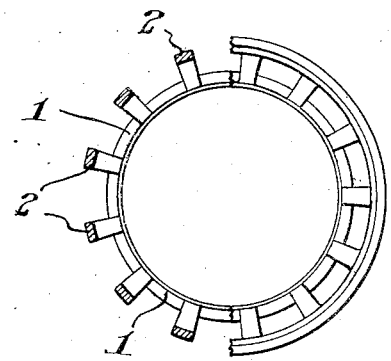
Figure 5:
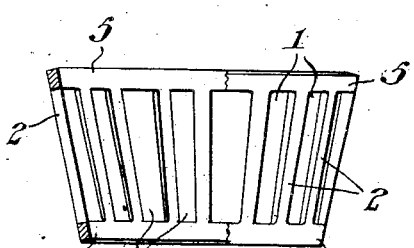
Figure 6:
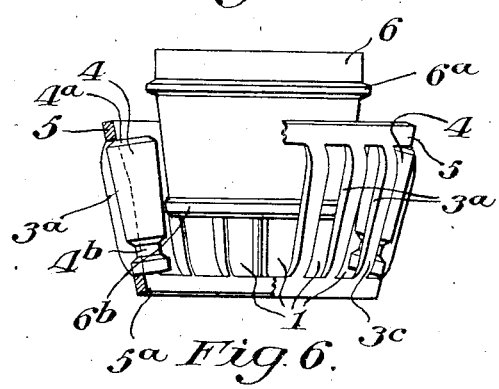
Figure 7:
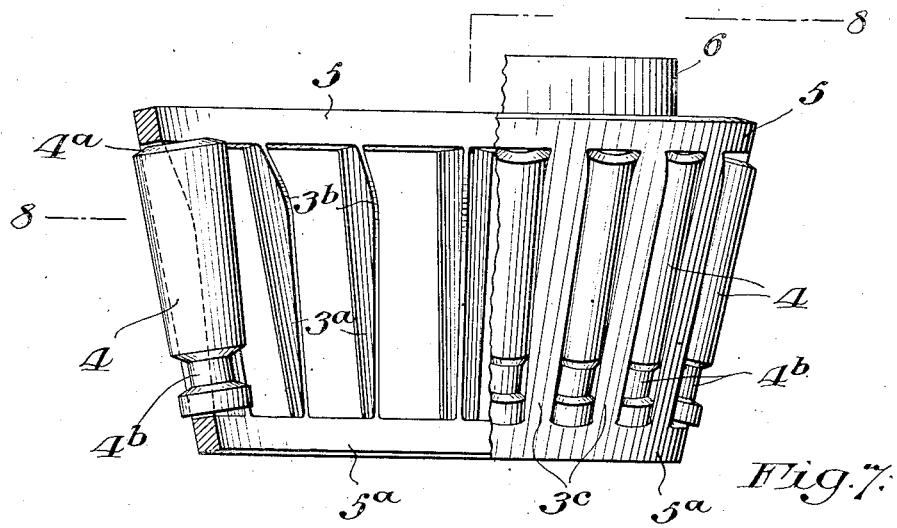
Figure 8:
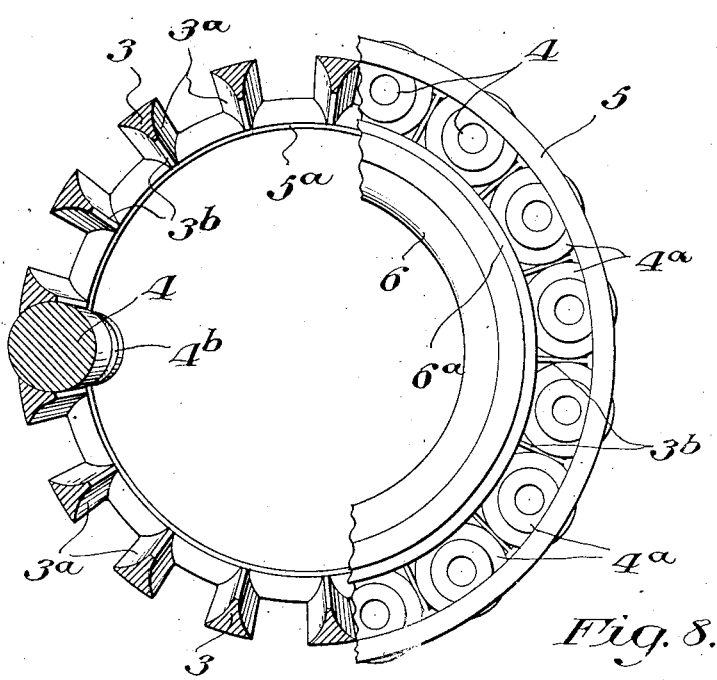

In the drawing, Figure 1 is a side view of a cylindrical section of tubing of the character required for making a cage; Fig. 2 is a disk cut from flat stock from which the cage may be pressed; Fig. 3 is a side elevation of a cage blank produced by shaping the sections shown in Fig. 1 or 2; Fig. 4 is a part sectional end view of the conical blank of Fig. 2 after perforation to produce roughly the seats and bridges for holding the rollers; Fig. 5 is a broken side elevation of the perforated cage shown in Fig. 4; Fig. 6 is a broken side elevation of a bearing in process of assembly with the bridges of the cage pressed to form and bent outwardly to facilitate the assembly of the parts; Fig. 7 is a broken side elevation of a finished bearing embodying my improvements; and Fig. 8 is a part sectional end view taken on the line 8—8 of Fig. 7.

The cylindrical blank of Fig. 1 and the flat disk of Fig. 2 are pressed by means of dies to produce the conical blank of Fig. 3, and the latter is perforated by punching to produce the cage blank of Figs. 4 and 5, containing the apertures 1 separated by the ribs 2, which are parallel to the cone elements and approximately rectangular in cross section as shown here. The ribs 2 are cold pressed to provide the bridges 3, as illustrated in Figs. 6 to 8 inclusive. These bridges 3 have respectively the concave conical surfaces $3^a$ converging inwardly to the inner edges $3^b$ which are projected or bowed inwardly by extrusion of the metal, the outer surfaces $3^c$ of such ribs being expanded by the operation. The adjacent surfaces of adjacent bridges thus formed provide conical bearings conforming to the surfaces of the respective rollers 4 to be seated between them and to be limited in end movement by the continuous circular ends 5 and $5^a$ of the cages which form the ends of the seats.

As illustrated in Fig. 6, in the assembly of the bearing, the bridges 3 may be bent outwardly and the rollers 4 entered in the seats formed thereby to facilitate the entry of the cone 6, the latter being provided at its larger end with the circular rib $6^a$ for engaging the conical surfaces $4^a$ at the larger ends of the rollers and at its smaller end with the concentric circular rib $6^b$ for engaging the circular grooves or channels $4^b$ in the smaller ends of the rollers.

After the assemblage of the parts, the bridges 3 are bent inwardly so that their surfaces $3^a$ conform to the surfaces of the rollers with a working clearance of say .005" over the surfaces of the rollers and the latter being controlled thereby so as to maintain their correct working relations. It will be observed that the control exercised upon the rollers is facilitated by the comparatively large arc of the curved surfaces of the bridges, such surfaces being extended by the described extrusion or expansion of the metal so that the outer surfaces of such ribs are spread and the inner edges project beyond the usual or general interior contour which would be indicated by the surface of the cone contacting with the inner surfaces of the parts 5 and 5ᵃ.

Having described my invention, I claim:

1. The combination with a set of rollers, of an anti-friction bearing cage, adapted to be carried by said rollers, said cage having curved ends and connecting bridges providing roller seats, adjacent bridges having curved bearing surfaces spaced at their inner edges to permit conforming rollers to be entered between them and between said ends and the respective bridges having narrow inner edges permitting adjacent rollers to approximate without making contact.

2. An anti-friction bearing cage having integrally formed ends and solid connecting bridges providing roller seats, adjacent bridges having curved bearing surfaces adapted to permit conforming rollers to be entered between them and between said ends, in combination with channeled rollers disposed in said seats and a bearing element within the circle of said rollers and having a circular rib engaged in said channels.

3. A solid and jointless roller bearing cage provided with concentric end rings and connecting bridges forming roller controlling seats, in combination with rollers disposed in said seats, said bridges having respectively concave surfaces converging inwardly and narrow inner edges exterior to the curve concentric to said rings and passing through the axes of said rollers.

4. A solid and jointless roller bearing cage provided with concentric end rings and connecting bridges forming roller controlling seats, in combination with rollers disposed in said seats, said bridges having respectively surfaces converging inwardly so as to provide bearing surfaces of substantial width for controlling said rollers and inner edges exterior to the curve passing through the axes of said rollers, and a bearing element within the circle of said rollers, said element having integral circular ribs adapted for engaging said rollers.

5. A jointless, approximately conical pressed metal bearing cage provided with continuous curved ends and connecting bridges forming roller seats, each bridge having an expanded outer surface and conical surfaces converging toward the inner part thereof, said part extending inwardly beyond the coincident straight line joining the inner surfaces of said ends.

6. An approximately conical bearing cage provided with apertures separated by bridges, each bridge having an expanded outer surface and plain conical surfaces extending substantially the length thereof and converging toward an inwardly extended part thereof having an inwardly bowed edge to provide means for seating conical rollers.

In testimony whereof I have hereunto set my name this 15th day of July, 1918.

TRACY V. BUCKWALTER.